United States Patent [19]

Munger

[11] Patent Number: 4,899,522
[45] Date of Patent: Feb. 13, 1990

[54] HYDRAULIC POWERED ARM OF BALANCE CUTTER DEVICE

[76] Inventor: Serge Munger, 1141, Blvd. Auger East, Alma, Quebec, Canada, G8B 5V2

[21] Appl. No.: 274,276

[22] Filed: Nov. 21, 1988

[51] Int. Cl.$^4$ ............................................. A01D 25/08
[52] U.S. Cl. ..................................... 56/10.4; 56/10.9; 56/255; 56/295
[58] Field of Search ................... 56/10.4, 10.9, 14.7, 56/17.5, 255, 295, DIG. 11, DIG. 17, DIG. 22

[56] References Cited

U.S. PATENT DOCUMENTS

| | | | |
|---|---|---|---|
| 3,061,996 | 11/1962 | Ripps | 56/25 |
| 3,319,407 | 5/1967 | Jordan et al. | 56/25.4 |
| 3,599,403 | 8/1971 | Gantz | 56/10.4 |
| 3,729,910 | 5/1973 | Hardee | 56/11.9 |
| 3,949,539 | 4/1976 | Cartner | 56/10.4 |
| 4,506,464 | 3/1985 | Cartner | 37/91 |
| 4,509,315 | 4/1985 | Giguere | 56/255 X |
| 4,769,977 | 9/1988 | Milbourn | 56/255 X |

Primary Examiner—William P. Neuder
Attorney, Agent, or Firm—Bacon & Thomas

[57] ABSTRACT

The brushwood cutting device comprises a frame structure, a massive circular flywheel disk rotatable about its geometrical axis, and a hydraulic motor mounted on the frame structure for rotating the flywheel disk at high speed. A first flat and rectangular blade has an end attached to the disk through a first, peripheral pivot, while a second blade of same shape has an end also attached to the disk through a second, peripheral pivot, which first and second pivots are diametrically opposed with respect to each other. The frame structure comprises a plurality of vertically positioned transversal plate members, including front and rear plate members and intermediate ones. Each intermediate plate member is provided with an elongated aperture in which the disk and blades rotate. The frame structure is pivotally mounted at the distal end of a hydraulic backhoe whereby the brushwood cutting device can be moved as desired through operation of the backhoe.

11 Claims, 5 Drawing Sheets

HYDRAULIC POWERED ARM OF BALANCE CUTTER DEVICE

BACKGROUND OF THE INVENTION

1. Field of the Invention:

The present invention relates to a device for cutting brushwood containing bushes, shrubs and the like, as well as other vegetation. The brushwood cutting device is advantageously mounted on the distal end of a multiple-joint backhoe operated through hydraulic cylinders to form a hydraulic powered arm of balance cutter device.

2. Background of the Invention:

One of the longstanding problems in forestry industries, road maintenance, large and small-scale farming, high voltage transportation line cleaning, etc, has been to control the undersirable shrubs, bushes and the like (brushwood). It has been experienced that the conventional cutting devices are not practical for the purpose of cutting such brushwood.

A first example of conventional cutter device is illustrated and described in U.S. Pat. No. 3,319,407 (Jordan et al.) issued on May 16, 1967. As shown in FIG. 17 of this patent, a pair of superposed bars are rotated through a driving shaft. At the opposite ends of the two bars are mounted respective blades through two diametrically opposed pivots. If the cutter device of Jordan et al. is used to cut brushwood, the bars hit the bushes, shrubs, and the like and break. Obviously, the cutter device of U.S. Pat. No. 3,319,407 is not structured to cut brushwood.

A second example of conventional cutter device is proposed in FIG. 3 of U.S. Pat. No. 4,506,464 (Cartner) issued on Mar. 26, 1985. The device of Cartner comprises as illustrated in FIG. 3 a light-weight rotating disk on the periphery of which are fixedly attached cutter blades. If used for cutting brushwood, the blades hit the larger bushes and shrubs, and eventually other obstacles such as stumps, and these blades and possibly the light-weight disk are damaged. The life of the device of U.S. Pat. No. 4,506,464 is accordingly very short when used in cutting brushwood. Moreover, due to the light-weight design of the rotating disk of Cartner, its inertia is low and the rotational speed is greatly influenced by any shock between the blades and the brushwood, whereby the efficiency of the device in cutting brushwood is obviously reduced by a rotational speed widely varying in time.

It can further be easily appreciated by one skilled in the art that the housing proposed in each of the above-mentioned U.S. Pat. Nos. 3,319,407 and 4,506,464 is not adapted to carry out cutting of brushwood including bushes, shrubs and the like.

OBJECT OF THE INVENTION

Accordingly, the main object of the present invention is to provide a device especially designed for cutting brushwood efficiently, while eliminating the above discussed drawbacks of the prior art.

SUMMARY OF THE INVENTION

More specifically, in accordance with the present invention, there is provided a device for cutting brushwood including bushes, shrubs and the like, comprising:
 a protective frame structure;
 a massive, circular flywheel disk having a geometrical axis and an annular, outer edge surface, which flywheel disk is mounted rotative about its geometrical axis on the frame structure;
 rotative driving means, also mounted on the frame structure for rotating the flywheel disk at high speed about its geometrical axis; and
 a first blade attached on the flywheel disk through a first pivot peripherally mounted on the circular disk, and a second blade also attached to the disk through a second pivot also peripherally mounted on the massive disk, which first and second pivots are diametrically opposed with respect to each other.

In operation, rotation at high speed of the flywheel disk produces a centrifugal force on the first and second blades to protrude these blades outwardly beyond the annular, outer edge surface of the circular disk, and the frame structure is so moved that the protruding blades hit the brushwood to cut the same.

Contrary to the prior art cutter device of U.S. Pat. No. 4,506,464, the first and second blades of the brushwood cutting device of the present invention pivot on their respective first and second pivots to prevent damage to these blades when hitting larger bushes and shrubs, bush and shrub stumps, and other obstacles.

Moreover, the flywheel nature of the circular disk helps this disk to maintain its rotational speed constant to allow the blades to efficiently cut the brushwood. One of the drawbacks of the cutter device of U.S. Pat. No. 4,506,464 is thereby eliminated.

As the flywheel disk is massive and circular, obstruction in the rotational movement of the disk caused by bushes, shrubs, bush and shrub stumps, and other obstacles contacting the disk is greatly reduced and possible only by friction. Accordingly, damage to the flywheel disk caused by obstruction is prevented, contrary to the cutter device as described in U.S. Pat. No. 3,319,407.

Advantageously, the frame structure comprises front and rear, transversal plate members, the flywheel disk and the first and second blades rotating between these front and rear plate members. The frame structure also advantageously comprises at least one intermediate, transversal plate member interposed between the front and rear members and each defining an elongated aperture in which the disk and the first and second blades rotate. The above defined plate members prevent contact of the flywheel disk and blades with the ground, with large rocks and stones, and with tree stumps, while allowing penetration of the brushwood into the frame structure to allow the first and second blades to cut the same. The plate members also hold the bushes, shrubs and the like in position while the first and second blades cut them, thereby increasing the efficiency of the brushwood cutting device.

Preferably, each of the front, rear and intermediate plate members has a bottom surface convexly curved to form a runner capable of sliding on the ground when the brushwood cutting device is moved laterally. The brushwood then penetrates the frame structure between the plate members to reach the first and second rotating blades.

A quick fitting attachment is advantageously provided for pivotally attaching the frame structure to a distal end of a hydraulic backhoe. The brushwood cutting device can then be inclined ad moved upwardly, downwardly, laterally, forwardly and rearwardly through operation of the backhoe. When attached to the distal end of a backhoe, the rotative driving means of the brushwood cutting device comprises a hydralic motor for rotating the flywheel disk, which motor is supplied with hydraulic fluid under pressure by the pump unit supplying the hydraulic cylinders of the backhoe. The brushwood cutting device of the invention then constitutes a hydraulic powered arm of balance cutter device.

The objects, advantages and other features of the present invention will become more apparent upon reading of the following non restrictive description of a preferred embodiment thereof, made with reference to the accompanying drawings.

DETAILED DESCRIPTION OF THE PREFERRED EMBODIMENT

Figure 1:
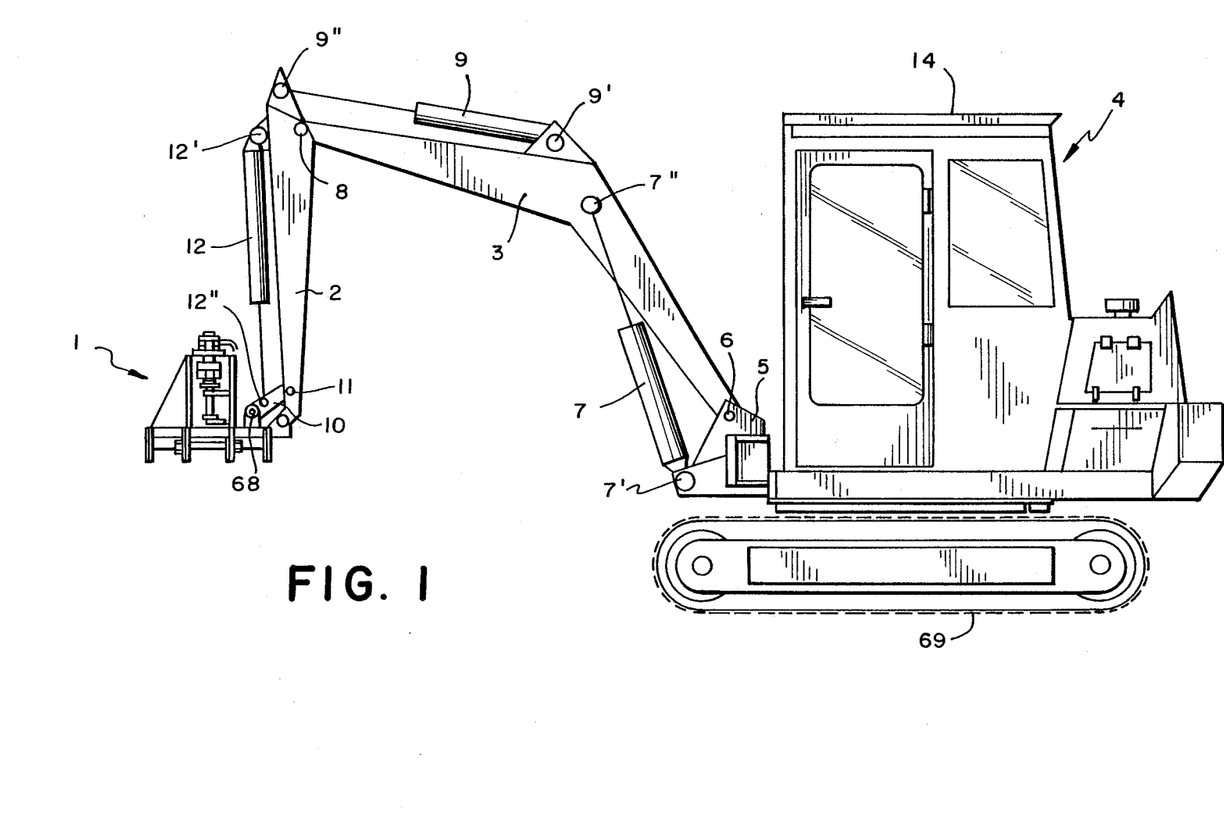
FIG. 1 shows a brushwood cutting device according to the invention mounted at the distal end of a multiple-joint hydraulic backhoe to form a hydraulic powered arm of balance cutter device.

Referring now to FIG. 1 of the drawings, the brushwood cutting device generally identified by the reference 1 is pivotally mounted at the distal end of a multiple-joint bakchoe of a heavy, hydraulic shovel generally identified by the reference 4. The backhoe comprises a base 5, a boom 3 and an arm 2. The boom 3 is attached at the proximate end thereof to the base 5 through a transversal pivot 6. The boom 3 can be pivoted about the pivot 6 by means of a hydraulic cylinder 7 having its cylinder end connected to the base 5 through a transversal pivot 7' and its shaft end connected to the boom 3 through a transversal pivot 7". The arm 2 of the backhoe has its promixate end pivotally connected to the distal end of the boom 3 through a transversal pivot 8, which arm 2 can therefore be pivoted about the pivot 8 by means of a second hydraulic cylinder 9 having its cylinder end connected to the boom 3 through a transversal pivot 9' and its shaft end connected to the arm 2 through a transversal pivot 9". The bakchoe further comprises a short, pivoting arm 10 mounted on the distal end of the arm 2 through a pivot 11, which arm 10 can be pivoted about the pivot 11 through a third hydraulic cylinder 12 having its cylinder end attached to the distal end of the boom 3 through a transversal pivot 12' and its shaft end connected to the short arm 10 through another transversal pivot 12". Such a backhoe construction is well known in the art, and for that reason, it will not be further elaborated.

As the heavy shovel 4 comprises a cab 14, supporting the backhoe base 5, which is rotatable about a vertical axis with respect to a track assembly 69 on which the heavy shovel displaces, the cutting device 1 can be displaced laterally on either side by pivoting the pivot cab 14 with respect to the track assembly 69. By operating the hydraulic cylinders 7, 9 and 12, it is also possible to displace the cutting device 1 forwardly, rearwardly, upwardly and downwardly as desired. The hydraulic cylinder 12 also allows the operation of the heavy shovel 4 to modify the attitude of the cutting device 1, that is to incline it in order to follow the irregularities of the ground.

Figure 4:
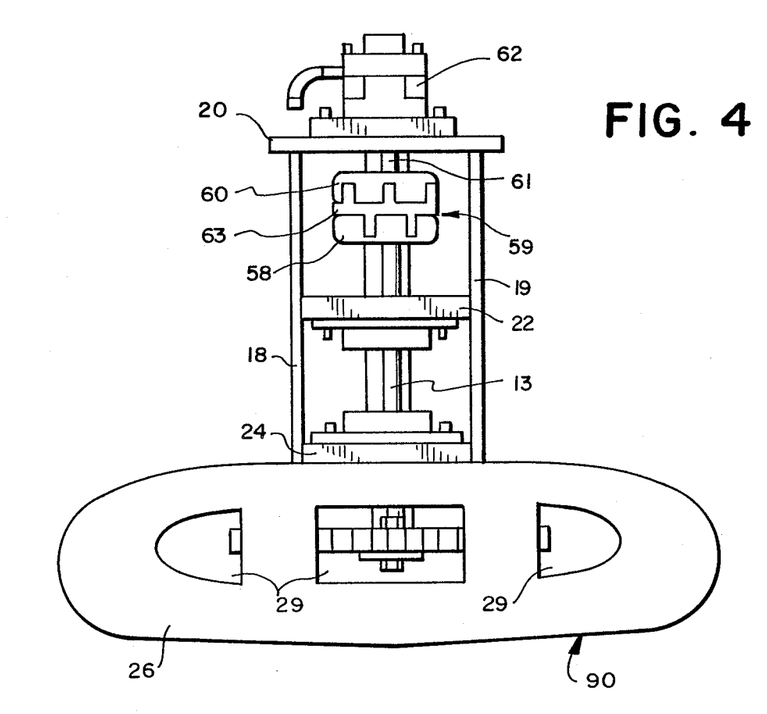
FIG. 4, is a front, elevation view of the brushwood cutting device of FIGS. 1, 2 and 3 provided with a hydraulic motor.

Referring now to FIGS. 2 to 5 of the drawings, the cutting device 1 comprises a frame structure made of steel and formed of the following elements:

two longitudinal, parallel bars 15 and 16 lying in respective, vertical and parallel planes;

a transversal, vertical plate member 17 having its left and right side portions welded to the bars 15 and 16, respectively;

a right, rectangular plate member 18 parallel to the bar 15 and welded both to the bar 15 and the plate member 17;

a right, vertical and rectangular plate member 19 parallel to the bar 16 and welded both to the latter bar and the plate member 17;

a horizontal upper base plate 20 welded to the front face of the plate member 17 and to the upper end of the two plate members 18 and 19, which upper base plate 20 is provided with a central, circular opening 21;

a middle, horizontal base plate 22 welded to the front face of the plate member 17 and to the inner faces of the two lateral plates 18 and 19, and also provided with a central, circular opening 23;

a lower, horizontal base plate 24 also welded to the front face of the plate member 17 and to the lower end of the two plates 18 and 19, and also provided with a central, circular opening 25;

a transversal, front plate 26 welded to the front end of the bars 15 and 16 and reinforced by corner plates 27 and 28 welded both to the plate 26 and the bars 15 and 16, respectively. As illustrated in FIG. 4, the plate 26 is elongated, oval, vertically positioned and provided with apertures 29;

a transversal, rear plate 30 welded to the rear end of the bars 15 and 16 and reinforced by corner plates 31 and 32 welded both to the plate 30 and to the bars 15 and 16 respectively. The plate 30 is elongated, oval and vertically positioned as the plate 26, but is provided with no apertures;

two parallel ears 33 and 34 welded on the rear face of the plate 30 and provided with aligned, circular holes in which is introduced a horizontal, transversal shaft section 35 welded to the ears 33 and 34; and a horizontal plate 36 welded on the inner face of the two bars 15 and 16 and to the front face of the plate 30 to support two ears 37 and 38 provided with respective, aligned holes 39 and 40.

Figure 3:
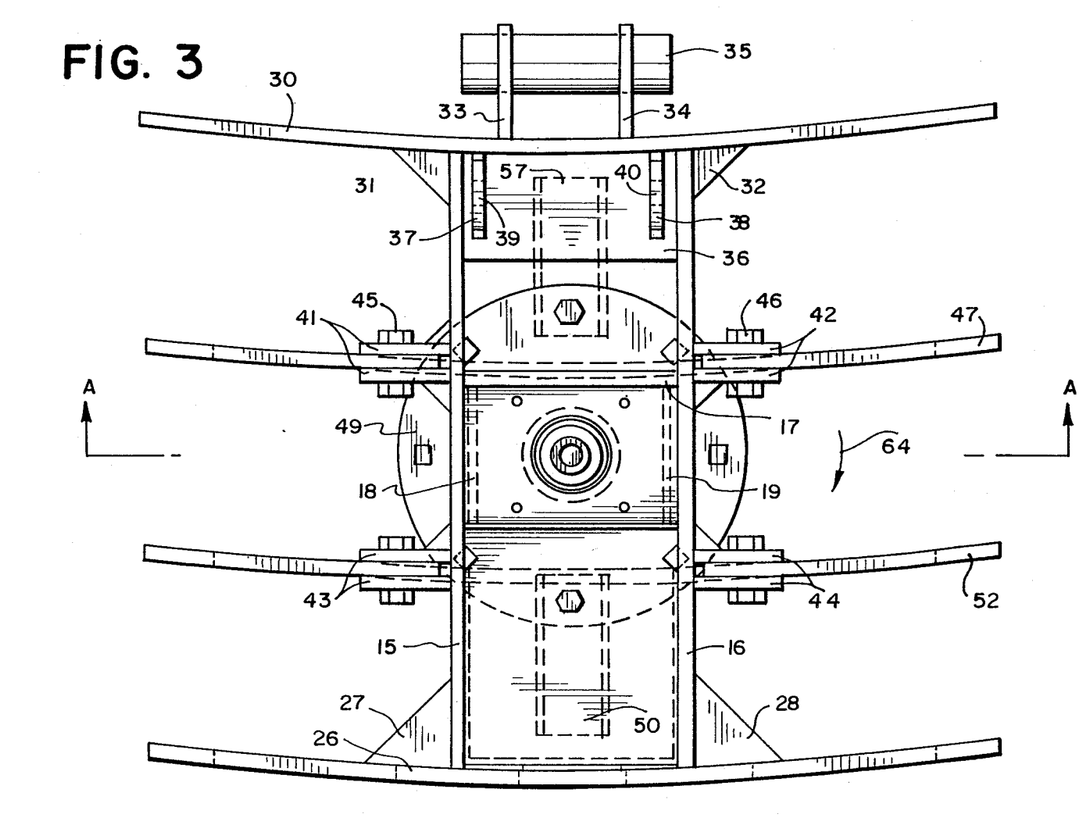
FIG. 3 is a plan view of the brushwood cutting device of FIGS. 1 and 2.

Welded on the outer face of the bar 15 is a first pair of parallel ears 41 and on the outer face of the bar 16 a second pair of parallel ears 42. As illustrated in FIG. 3, a third pair of parallel ears 43 and a fourth pair of parallel ears 44 are also welded on the outer surfaces of the bars 15 and 16, respectively.

Figure 5:
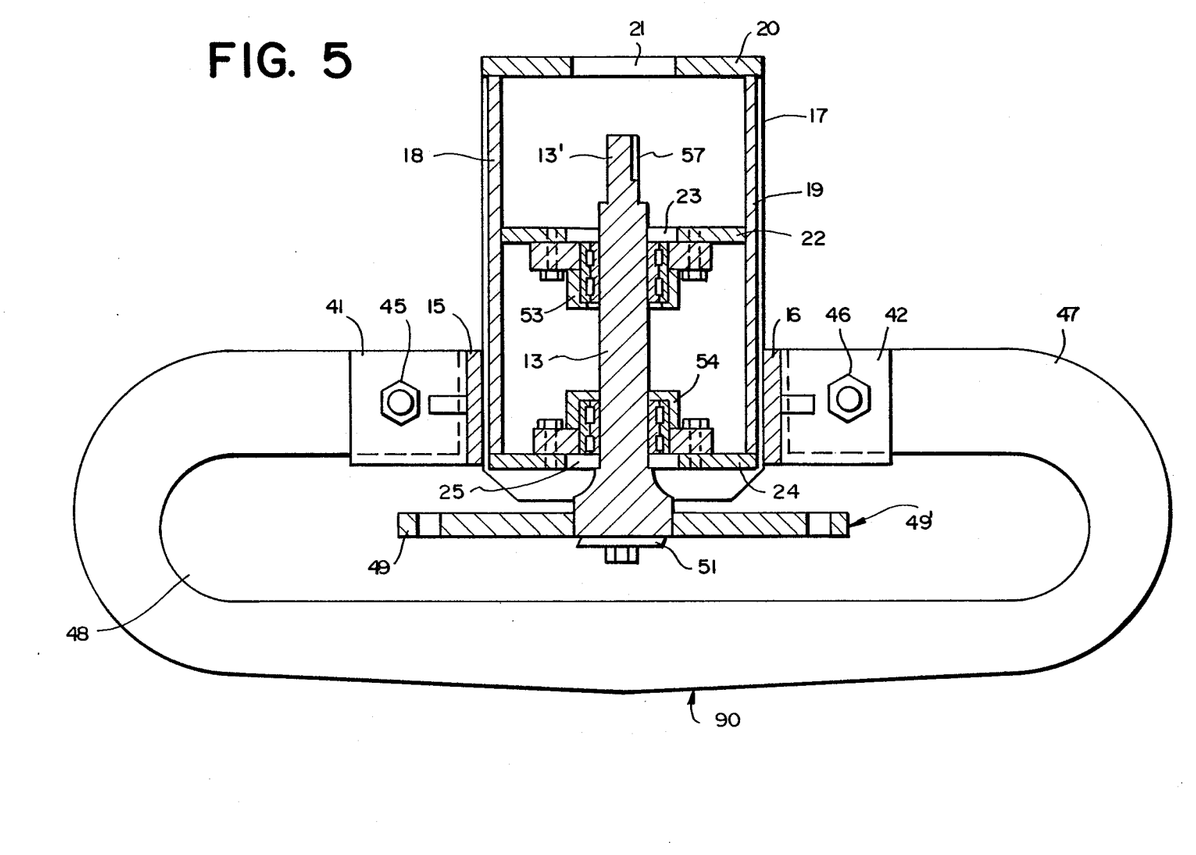
FIG. 5 is a cross-sectional view of the cutting device of FIG. 3 taken along the axis A—A.

The two pairs of ears 41 and 42 are used to attach to the frame structure a transversal plate 47 which is elongated, oval shaped and vertically positioned as illustrated in FIG. 5. More specifically, the two ends of the plate 47 are attached to the respective pairs of ears 41 and 42 through bolt and nut assemblies 45 and 46. The plate 47 defines an elongated aperature 48 in which a flywheel disk 49 and two blades 50 and 51 rotate as described in greater detail hereinafter.

Another plate 52 identical to the plate 47 has its two ends attached to the two pairs of ears 43 and 44 as described hereinabove.

As can be seen in FIG. 3, the spacing between adjacent ones of the plates 26, 30, 47 and 52 is constant.

As illustrated in FIGS. 4 and 5, the plates 26, 30, 47 and 52 each have a bottom surface 90 convexly curved to form a runner capable of sliding on the ground when the cutting device 1 is moved laterally. Moreover, as illustrated in FIG. 3, each plate 26, 30, 47 and 52 define an arc of circle having a radius of curvature which corresponds substantially to a mean distance, between the concerned plate member and the vertical axis of rotation of the pivot cab 14 (FIG. 1), which can be obtained through operation of the backhoe.

The cutting device 1 further comprises a vertical shaft 13 passing through the hole 23 of the plate 22 and the hole 25 of the plate 24. The shaft 13 is mounted on flange bearings 53 and 54 and rotates about its longitudinal axis on these flange bearings 53 and 54 respectively bolted under the plate 22 and on the plate 24.

The flywheel disk 49 is massive, circular and made of steel plate of even thickness, and is provided with a central, circular hole fitting around the lower end of increased diameter of the shaft 13. As shown in FIG. 5, the disk 49 is welded to the shaft 13 perpendicular to the latter after the lower end of this shaft has been inserted in the central hole of the wheel 49, whereby the disk 49 is rotatable about its geometrical axis which coincides with the rotation axis of the shaft 13.

The two blades 50 and 51 (FIGS. 2 and 3) are attached at one end thereof under the disk 49 through two diametrically opposed pivots 55 and 56 formed of shoulder bolts and peripherally mounted on the disk 49 in peripheral, diametrically opposed holes. Accordingly, the blades 50 and 51 pivot in a plane that is parallel with respect to plane of the disk 49. Thus, when the disk 49 is placed in a horizontal disposition, the blades 50 and 51 shall pivot horizontally. As can be seen in FIG. 5, with respect to the blade 51, the latter is sharpened on both side thereof whereby it can be reversed. A longer life for the blades 50 and 51 is thereby obtained.

Figure 2:
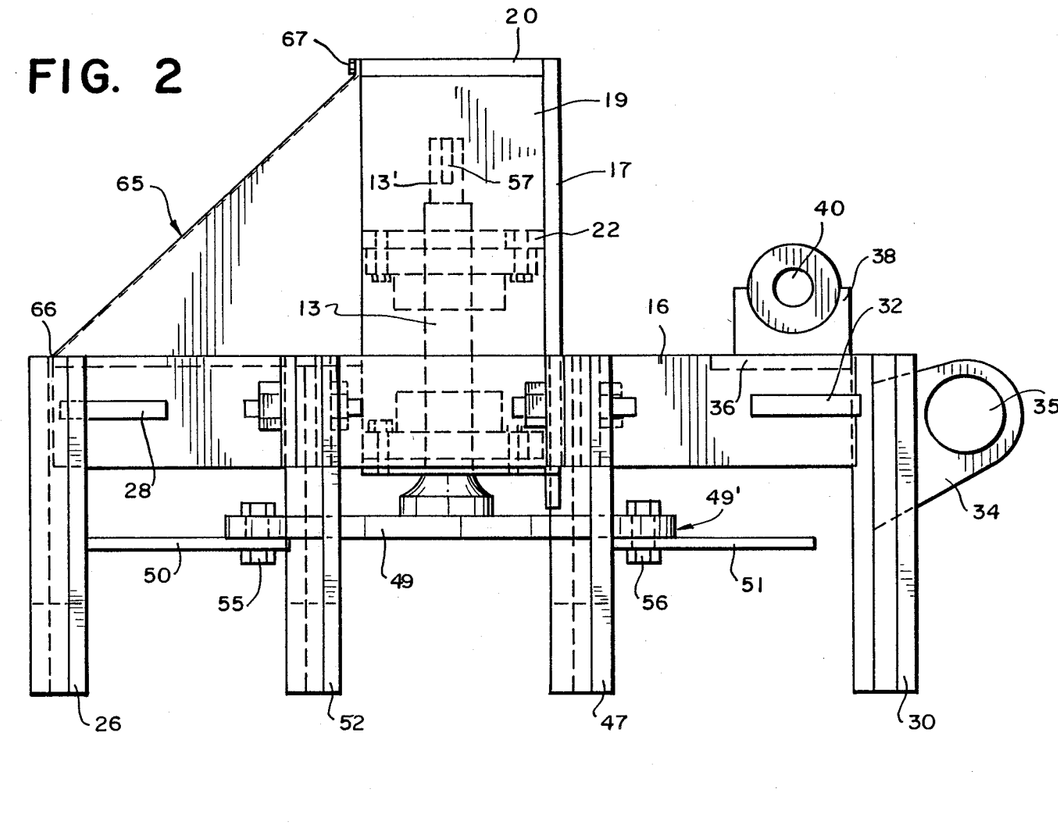
FIG. 2 is a side, elevation view of the brushwood cutting device of FIG. 1.

As illustrated in FIGS. 2, 4 and 5, the upper end 13' of the shaft 13 is of reduced diameter and is grooved at 57 to receive a lower portion 58 of a flexible coupling 59. The latter coupling also comprises an upper portion 60 attached to a driving shaft 61 of a hydraulic motor 62 bolted on the base plate 20 and supplied with hydraulic fluid under pressure from the existing pump unit of the heavy shovel 4 through supply hoses provided with quick coupling fitting. It should be noted here that the same pump unit supplies with hydraulic fluid under pressure the cylinders 7, 9 and 12. As illustrated in FIG. 4, the lower and upper portions 58 and 60 of the flexible coupling 59 are toothed and are interconnected together through a rubber, toothed transmission key 63 adapting to both the toothed portions 58 and 60. The rubber key 63 absorbs and accordingly reduces transmission of shocks to the motor 62 from the disk 49 and blades 50, 51 during cutting of bushes, shrubs and the like and also compensates for the shafts 13 and 61 slightly out of alignment, temporarily or permanently. The lower portion 58 of the flexible coupling 59 is of course attached to the upper end 13' of the rotative shaft 13 through a conventional key and groove assembly blocked by means of a conventional cap screw, as well as the upper coupling portion 60 to the driving shaft 61 of the hydraulic motor 62.

As can be appreciated, supply of the motor 62 with hydraulic fluid under pressure causes rotation of this motor and rotation of the flywheel disk 49 through the driving shaft 61 which traverses the hole 21 of the plate 20, the flexible coupling 59 and the shaft 13, and that in the direction shown by the arrow 64 in FIG. 3. The rotational speed is about 3000 R.P.M.

A manually operated two-position control valve is installed in the cab 14 of the heavy shovel 4 to allow the operator to activate and deactivate the hydraulic motor 62, which valve is of course serially mounted on one of the supply hoses of the latter motor.

A cover 65 made of thin metal plate comprises a top planar and inclined wall and two lateral corner plates. The cover 65 is preferably hinged at 66 and bolted at 67 to the base plate 20. To open the cover 65, one has only to remove the bolt 67 and to pivot the cover 65 about the hinge 66. The two lateral corner plates of the cover 65 close the area between the top, inclined wall of the cover 65 and the plate member 18 and the bar 15 on the right side, and between the inclined, top wall and the plate member 19 and bar 16 on the left side.

The operation of the cutting device 1 of the present invention for cutting brushwood including bushes, shrubs and the like, as well as other vegetation will now be explained in detail in the following description.

In order to use the cutting device 1, it is first mounted on the distal end of the backhoe of the shovel 4. For that purpose, two-prong forks positioned at the distal end of the arm 2 of the backhoe (FIG. 1) are positioned on the two end portions of the shaft 35 (FIG. 3) outside the ears 33 and 34, through operation of the backhoe. After this operation is completed, the cylinders are operated to position a transversal hole 68 at the end of the pivoting arm 10 in alignment with the holes 39 and 40 of the two ears 37 and 38, so that a pin can be inserted into the so aligned holes 39, 68 and 40. The pin is of course blocked in this position. This type of attachment is well known in the art and accordingly will not be further elaborated.

The cutting device 1 according to the present invention can therefore be attached to the distal end of nearly any kind of hydraulic escavator, such as the heavy shovel 4 of FIG. 1, equipped with a suitable attachment device. It is of course possible to slightly modify the design of the attachment device of either the distal end of the backhoe or the cutting device 1, if required.

When attached to the extend end of the backhoe of the heavy shovel 4, as illustrated in FIG. 1, the cutting device 1 forms a hydraulic powered arm of balance cutter device.

After the cutting device 1 has been attached at the distal end of the backhoe of the shovel 4, the operator opens the above-mentioned two-position control valve to supply with hydraulic fluid under pressure the motor 62. The flywheel disk is then rotated at a high speed, that is about 3000 R.P.M., in the direction shown by the arrow 64 of FIG. 3. Rotation at high speed of the flywheel disk 49 produces a centrifugal force on the blades 50 and 51 to protrude these blades outwardly beyond the annular, outer edge surface 49' of the circular disk 49. More specifically, the blades 50 and 51 align with a diameter of the disk 49.

Through operation of the backhoe, the operator moves the device 1 (its frame structure) laterally on either side by pivoting the pivot cab 14 of the heavy shovel 4 about its vertical rotation axis, with respect to the track assembly of the shovel 4. The operator also operates the hydraulic cylinders 7, 9 and 12 to move the cutting device 1 (its frame structure) upwardly, downwardly, forwardly and rearwardly and to incline as desired the same, to follow the irregularities of the ground and thereby providing for better cutting of the brushwood. More specifically, the frame structure of the device 1 is so moved that the protruding blades 50 and 51 hit the brushwood to cut the same.

As mentioned hereinabove, the blades 50 and 51 pivot on their respective pivots 55 and 56 to prevent damage to these blades when hitting larger bushes and shrubs, bush and shrub stumps, and other obstacles such as a stone. In the case of a big bush or shrub, the latter is cut through a plurality of passages of the two blades, and that without damaging the same, whereby the effective life of the blades is prolonged.

As the disk 49 is massive (relatively thick) and heavy, and is rotated by the hydraulic motor 62 at a speed of about 3000 R.P.M., it constitutes a flywheel helping in maintaining its rotational speed constant, that is without noticeable fluctuations due to hitting of the blades with the bushes, shrubs and the like, in order to efficiently cut the brushwood.

When the cutting device 1 is displaced laterally and/or downwardly, the bushes, shrubs and the like, as well as other vegetation penetrate the frame structure between the plates 26, 30, 47 and 52. When they are hit by the blades 50 and 51, they rest on these plates and are therefore held in position to thereby facilitate cutting of the brushwood.

Due to the runner structure of the bottom surface of the plates 26, 30, 47 and 52, they easily slide on the ground when the cutting device 1 is moved laterally. The curved nature of these plates facilitates such lateral sliding and the penetration of the brushwood between the plates 26, 30, 47 and 52 during such lateral sliding, that is during pivoting of the cab 14 of the heavy shovel 4.

As described hereinabove, the flywheel disk 49 and the blades 50 and 51 rotate into the elongated aperture of the plates 47 and 52 and between the plates 26 and 30. Accordingly, no forward, rearward, lateral, downward or upward movement can cause contact of the blades 50 and 51 and of the disk 49 with the ground, large rocks and stones, tree stumps, and the like, whereby damage to these disk and blades caused by such contact is eliminated and the effective life of the cutting device 1 accordingly prolonged. The frame structure of the brushwood cutting device has therefore a protective function.

Another important characteristic of the cutting device 1 is the massive and circular nature of the flywheel disk 49. When the device 1 is displaced in the brushwood, no bush, shrub and the like can penetrate in the volume of rotation of the disk 49, which volume is constituted by the flywheel disk 49 itself. Consequently, obstruction in the rotational movement of the disk 49 caused by bushes, shrubs, bush and shrub stumps, and eventually other obstacles contacting the disk is greatly reduced. No damage to the flywheel disk can therefore be caused by such obstruction as rotation of the disk 49 cannot be impeded suddenly by an obstacle in the volume of rotation of the disk to break this disk and other elements of the device 1. Obstruction is only possible by friction.

Also, by retaining the bushes, shrubs and the like beyond the annular, outer surface 49' of the disk 49 during lateral movement of the device 1, the latter disk keeps the brushwood exposed to the protruding blades to efficiently cut the bushes, shrubs and the like.

It has been experienced that a hydraulic powered arm of balance cutter device as illustrated in FIG. 1 can cut brushwood in an area of 14 hectares each day. This of course illustrates the efficiency of the cutter device of the present invention.

Although the present invention has been described hereinabove by means of a preferred embodiment thereof, it should be pointed out that any modification to this preferred embodiment, within the scope of the appended claims, is not deemed to change or alter the nature and scope of the present invention.

What is claimed is:

1. A device for cutting brushwood including bushes, shrubs and the like, comprising:
   a protective frame structure;
   a massive, circular flywheel disk having a geometrical axis and an annular, outer edge surface, which flywheel disk is mounted rotative about its geometrical axis on said frame structure;
   rotative driving means, also mounted on said frame structure, for rotating the flywheel disk at high speed about its geometrical axis;
   a first blade attached to the said flywheel disk through a first pivot peripherally mounted on the circular disk, and a second blade also attached to the said disk through a second pivot also peripherally mounted on the massive disk, said first and second pivots being diametrically opposed with respect to each other;
   the frame structure including a front, transversal frame member, and a rear, transversal frame member, the said flywheel disk and said first and second blades rotating between said front and rear frame members, and at least one intermediate transversal frame member interposed between said front and rear frame members and defining an elongated aperture in which the said disk and said first and second blades rotate; and
   whereby, in operation, (a) rotation at high speed of the flywheel disk produces a centrifugal force on the first and second blades to protrude said blades outwardly beyond the annular, outer edge surface of the circular disk, (b) the frame structure is so moved that the protruding blades hit the brushwood to cut the same, (c) the first and second blades pivot on their respective first and second pivots to prevent damage to said blades when hitting larger bushes and shrubs, bush and shrub stumps, and other obstacles, (d) the flywheel nature of the circular disk helps said disk to maintain its rotational speed constant to allow said blades to efficiently cut the brushwood, and (e) as the flywheel disk is massive and circular, obstruction in the rotational movement of the said disk caused by bushes, shrubs, bush and shrub stumps, and other obstacles contacting the disk is greatly reduced and possible only by friction whereby damage to the flywheel disk caused by obstruction is prevented.

2. The brushwood cutting device of claim 1, wherein said massive, circular flywheel disk is made of a metal plate of even thickness.

3. The brushwood cutting device of claim 1, wherein said first and second blades are flat and rectangular, and wherein said first and second blades each have an end attached to the flywheel disk through said first and second pivots, respectively.

4. The brushwood cutting device of claim 1, wherein said driving means comprises a shaft rotatably mounted on the frame structure and having an end on which the flywheel disk is fixed, the said shaft rotating about an axis coinciding with the said geometrical axis of the flywheel disk.

5. The brushwood cutting device of claim 1, in which said frame structure comprises means for preventing contact of the flywheel disk and first and second blades with the ground, with large rocks and stones, and with tree stumps, while allowing penetration of the brushwood into said frame structure to allow the first and second blades to cut the same.

6. The brushwood cutting device of claim 1, in which the frame structure comprises means for holding the bushes, shrubs and the like in position while the first and second blades cut the same.

7. A brushwood cutting device according to claim 1, in which said front, rear and intermediate frame members are vertically positioned plate members.

8. A brushwood cutting device according to claim 7, in which the frame structure comprises means for attaching said frame structure to a distal end of a hydraulic backhoe rotatable about a vertical axis whereby said brushwood cutting device can be moved through operation of said backhoe, and wherein said front, rear and intermediate plate members are each bent to define an arc of circle having a radius of curvature corresponding substantially to a mean distance, between the said plate member and the said vertical axis, which can be obtained through operation of the said backhoe.

9. A brushwood cutting device according to claim 1, in which each of said front, rear and intermediate frame members has a bottom surface convexly curved to form a runner capable of sliding on the ground when the brushwood cutting device is moved laterally, the brushwood then penetrating the frame structure between said frame members to reach the first and second rotating blades.

10. A brushwood cutting device according to claim 1, wherein the frame structure comprises means for pivotally attaching said frame structure to a distal end of a hydraulic backhoe whereby said brushwood cutting device can be moved upwardly, downwardly, laterally, forwardly, and rearwardly, and can also be inclined through operation of said backhoe.

11. A device for cutting brushwood including bushes, shrubs and the like, comprising:
a protective frame structure;
a massive, circular flywheel disk having a geometrical axis and an annular, outer edge surface, which flywheel disk is mounted rotative about its geometrical axis on said frame structure;
rotative driving means, also mounted on said frame structure, for rotating the flywheel disk at high speed about its geometrical axis;
a first blade attached to the said flywheel disk through a first pivot peripherally mounted on the circular disk, and a second blade also attached to the said disk through a second pivot also peripherally mounted on the massive disk, said first and second pivots being diametrically opposed with respect to each other;
the frame structure including a front, transversal frame member, and a rear, transversal frame member, the said flywheel disk and said first and second blades rotating between said front and rear frame members, at least one intermediate, transversal frame member interposed between said front and rear frame members and defining an elongated aperture in which the said disk and said first and second blades rotate, the front, rear and intermediate frame members each being provided with a vertically positioned plate member, and each of said front, rear and intermediate plate members including a bottom surface convexly curved to form a runner capable of sliding on the ground when the said backhoe is rotated about said vertical axis, the brushwood then penetrating the frame structure between said plate members to reach the first and second rotating blades;
the frame structure further including means for attaching said frame structure to a distal end of a hydraulic backhoe rotatable about a vertical axis whereby said brushwood cutting device can be moved through operation of said backhoe, and wherein said front, rear and intermediate plate members are each bent to define an arc of circle having a radius of curvature corresponding substantially to a mean distance, between the said plate member and the said vertical axis, which can be obtained through operation of the said backhoe; and
whereby, in operation, (a) rotation at high speed of the flywheel disk produces a centrifugal force on the first and second blades to proturde said blades outwardly beyond the annular, outer edge surface of the circular disk, (b) the frame struture is so moved that the protruding blades hit the brushwood to cut the same, (c) the first and second blades pivot on their respective first and second pivots to prevent damage to said blades when hitting larger bushes and shrubs, bush and shrub stumps, and other obstacles, (d) the flywheel nature of the circular disk helps said disk to maintain its rotational speed constant to allow said blades to efficiently cut the brushwood, and (e) as the flywheel disk is massive and circular, obstruction in the rotational movement of the said disk caused by bushes, shrubs, bush and shrub stumps, and other obstacles contacting the disk is greatly reduced and possible only by friction whereby damage to the flywheel disk caused by obstruction is prevented.

* * * * *